(12) United States Patent
Meyers et al.

(10) Patent No.: US 10,930,266 B2
(45) Date of Patent: *Feb. 23, 2021

(54) METHODS AND DEVICES FOR SELECTIVELY IGNORING CAPTURED AUDIO DATA

(71) Applicant: Amazon Technologies, Inc., Seattle, WA (US)

(72) Inventors: James David Meyers, San Jose, CA (US); Kurt Wesley Piersol, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/665,461

(22) Filed: Oct. 28, 2019

(65) Prior Publication Data

US 2020/0066258 A1 Feb. 27, 2020

Related U.S. Application Data

(63) Continuation of application No. 16/036,345, filed on Jul. 16, 2018, now Pat. No. 10,475,445, which is a
(Continued)

(51) Int. Cl.
*G10L 15/08* (2006.01)
*G10L 15/04* (2013.01)
(Continued)

(52) U.S. Cl.
CPC .............. *G10L 15/08* (2013.01); *G10L 15/04* (2013.01); *G10L 15/20* (2013.01); *G10L 21/028* (2013.01);
(Continued)

(58) Field of Classification Search
CPC ... G10L 15/04; G10L 15/05; G10L 2015/088; G10L 15/20; G10L 15/22; G10L 15/222;
(Continued)

(56) References Cited

U.S. PATENT DOCUMENTS 5,199,080 A * 3/1993 Kimura .................. H03J 1/0025
381/110
6,138,100 A * 10/2000 Dutton ................ G10L 15/1822
704/275

(Continued)

*Primary Examiner* — Eric Yen
(74) *Attorney, Agent, or Firm* — Pierce Atwood LLP

(57) ABSTRACT

Systems and methods for selectively ignoring an occurrence of a wakeword within audio input data is provided herein. In some embodiments, a wakeword may be detected to have been uttered by an individual within a modified time window, which may account for hardware delays and echoing offsets. The detected wakeword that occurs during this modified time window may, in some embodiments, correspond to a word included within audio that is outputted by a voice activated electronic device. This may cause the voice activated electronic device to activate itself, stopping the audio from being outputted. By identifying when these occurrences of the wakeword within outputted audio are going to happen, the voice activated electronic device may selectively determine when to ignore the wakeword, and furthermore, when not to ignore the wakeword.

19 Claims, 10 Drawing Sheets

Related U.S. Application Data continuation of application No. 15/633,529, filed on Jun. 26, 2017, now abandoned, which is a continuation of application No. 14/934,069, filed on Nov. 5, 2015, now Pat. No. 9,691,378.

(51) Int. Cl.
| | | |
|---|---|---|
| *G10L 21/028* | | (2013.01) |
| *G10L 15/20* | | (2006.01) |
| *G10L 21/0208* | | (2013.01) |
| *G10L 15/22* | | (2006.01) |

(52) U.S. Cl.
CPC ........ *G10L 15/22* (2013.01); *G10L 2015/088* (2013.01); *G10L 2021/02082* (2013.01)

(58) Field of Classification Search
CPC ................ G10L 15/24; G10L 21/0208; G10L 2021/02082; G10L 21/0224; G10L 21/0272; G10L 21/028; G10L 15/08
See application file for complete search history.

(56) References Cited

U.S. PATENT DOCUMENTS

| | | | | |
|---|---|---|---|---|
| 6,603,835 | B2 * | 8/2003 | Engelke | H04M 3/42161 379/52 |
| 6,725,193 | B1 | 4/2004 | Makovicka | G10L 21/02 704/233 |
| 7,117,442 | B1 * | 10/2006 | Kemble | G06F 16/9038 715/727 |
| 8,738,382 | B1 * | 5/2014 | Herz | G06F 3/167 704/233 |
| 8,768,712 | B1 * | 7/2014 | Sharifi | G10L 15/08 704/275 |
| 10,062,384 | B1 * | 8/2018 | Sugiura | G06K 9/00624 |
| 10,152,966 | B1 * | 12/2018 | O'Malley | G10L 15/22 |
| 2002/0042709 | A1 * | 4/2002 | Klisch | G10L 15/04 704/231 |
| 2002/0055844 | A1 * | 5/2002 | L'Esperance | G10L 15/26 704/260 |
| 2006/0085199 | A1 * | 4/2006 | Jain | G10L 15/26 704/275 |
| 2006/0149546 | A1 * | 7/2006 | Runge | G10L 13/00 704/246 |
| 2007/0036232 | A1 * | 2/2007 | Hayashi | H04L 25/0232 375/260 |
| 2008/0140412 | A1 * | 6/2008 | Millman | G09B 19/06 704/270 |
| 2010/0211387 | A1 * | 8/2010 | Chen | G10L 25/78 704/226 |
| 2013/0021459 | A1 * | 1/2013 | Vasilieff | H04N 7/183 348/77 |
| 2013/0058471 | A1 * | 3/2013 | Garcia | H04M 3/42221 379/202.01 |
| 2014/0095177 | A1 * | 4/2014 | Kim | G10L 21/06 704/275 |
| 2014/0195247 | A1 * | 7/2014 | Parkinson | G10L 15/22 704/275 |
| 2014/0259138 | A1 * | 9/2014 | Fu | H04L 63/083 726/7 |
| 2014/0350926 | A1 * | 11/2014 | Schuster | G10L 15/26 704/233 |
| 2015/0006176 | A1 * | 1/2015 | Pogue | G10L 15/22 704/249 |
| 2015/0248885 | A1 * | 9/2015 | Koulomzin | G10L 15/08 704/251 |
| 2016/0055847 | A1 * | 2/2016 | Dahan | G10L 15/30 704/275 |
| 2016/0196830 | A1 * | 7/2016 | Riedmiller | G10L 19/22 704/500 |
| 2016/0217795 | A1 * | 7/2016 | Lee | G10L 15/30 |
| 2016/0260436 | A1 * | 9/2016 | Lemay | G10L 15/28 |
| 2016/0379635 | A1 * | 12/2016 | Page | G10L 15/063 704/251 |
| 2017/0053650 | A1 * | 2/2017 | Ogawa | G10L 15/063 |
| 2017/0068513 | A1 * | 3/2017 | Stasior | G10L 15/32 |
| 2017/0125036 | A1 * | 5/2017 | Wang | G10L 17/02 |
| 2018/0013886 | A1 * | 1/2018 | Rae | G10L 21/10 |
| 2018/0301147 | A1 * | 10/2018 | Kim | G06F 3/167 |
| 2019/0043492 | A1 * | 2/2019 | Lang | G06F 3/165 |

* cited by examiner

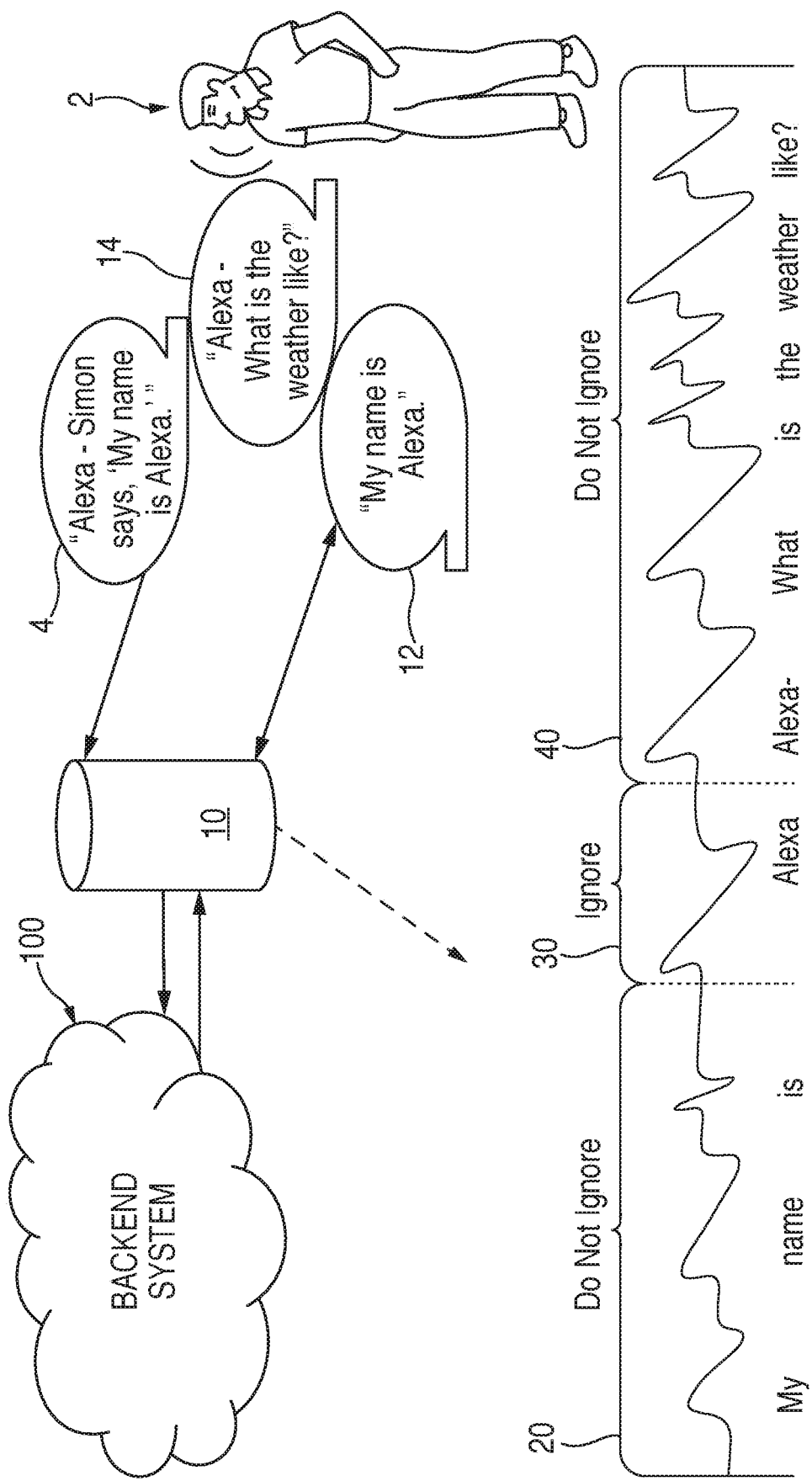

METHODS AND DEVICES FOR SELECTIVELY IGNORING CAPTURED AUDIO DATA

CROSS-REFERENCE TO RELATED APPLICATIONS

This application is a continuation of U.S. patent application Ser. No. 16/036,345, entitled METHODS AND DEVICES FOR SELECTIVELY IGNORING CAPTURED AUDIO DATA, filed Jul. 16, 2018 and scheduled to issue as U.S. Pat. No. 10,475,445, which is a continuation of U.S. patent application Ser. No. 15/633,529, entitled METHODS AND DEVICES FOR SELECTIVELY IGNORING CAPTURED AUDIO DATA, filed on Jun. 26, 2017, which is a continuation of U.S. patent application Ser. No. 14/934,069, entitled METHODS AND DEVICES FOR SELECTIVELY IGNORING CAPTURED AUDIO DATA, filed on Nov. 5, 2015, which is now U.S. Pat. No. 9,691,378. Priority is claimed to all of the above applications, the disclosures of which are incorporated by reference herein in their entireties.

BACKGROUND

Voice activated electronic devices are becoming more and more common in modern society. Typically, these voice activated electronic devices are activated when a certain wakeword is detected. The voice activated electronic devices may then output media data, such as audio or video, in response to a command made by an individual after the wakeword is said.

BRIEF DESCRIPTION OF THE DRAWINGS

FIG. 7A is illustrative diagram of another system for communicating with a backend system for determining portions of audio input data to ignore and portions of audio input data to not ignore in accordance with various embodiments;

DETAILED DESCRIPTION

Figure 1:
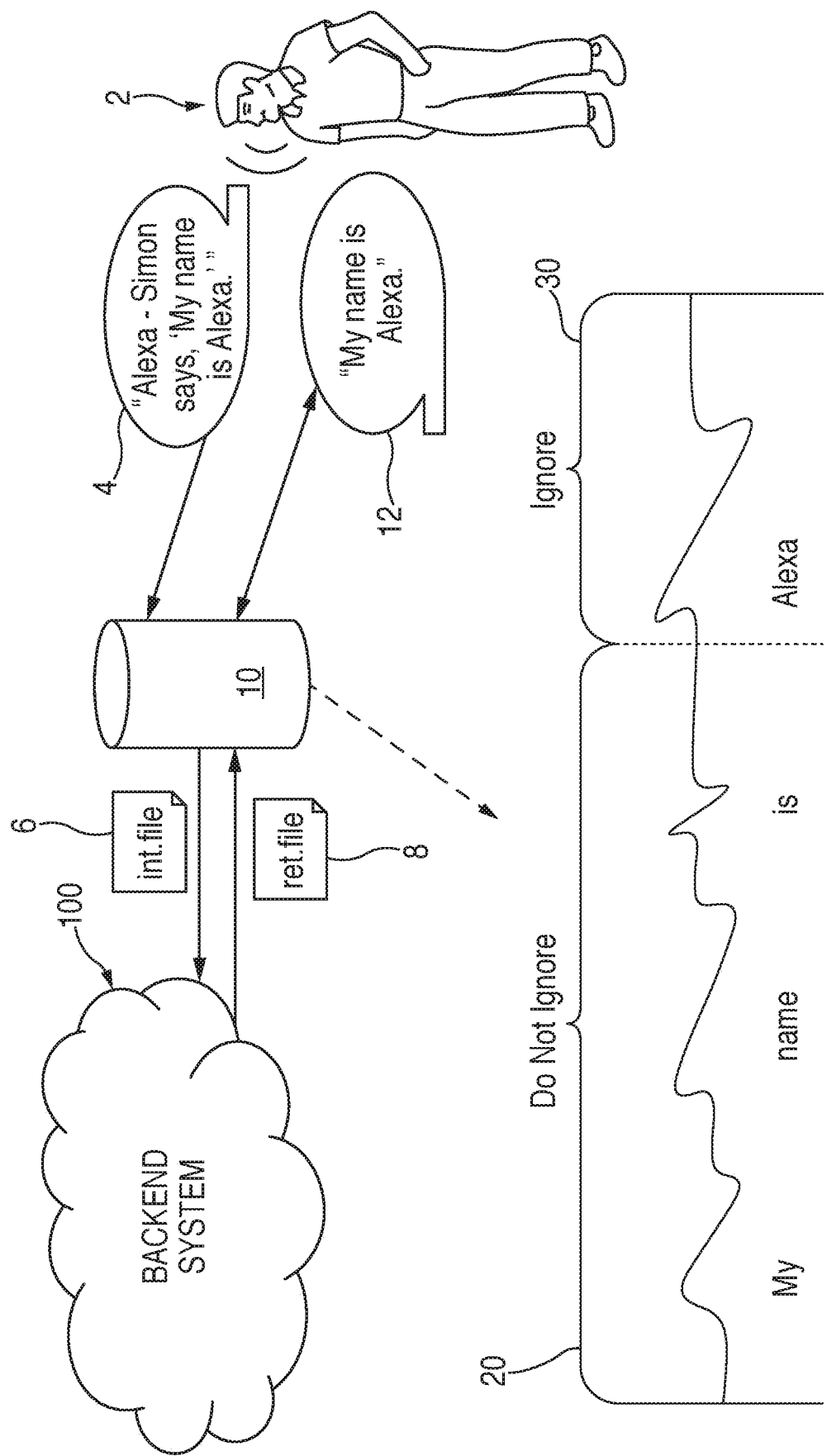
FIG. 1 is an illustrative diagram of a system for communicating with a backend system to determine portions of audio input data to ignore in accordance with various embodiments.

The present disclosure, as set forth below, is generally directed to various embodiments of methods and devices related to determining whether a wakeword or other type of sound to be outputted in the presence of a sound controlled electronic device should be ignored. As used herein, a sound controlled electronic device is capable of being activated in response to detection of a specific sound (e.g., a word, a phoneme, a phrase or grouping of words, or any other type of sound, or any series of temporally related sounds). For example, a voice activated electronic device is one type of sound controlled electronic device that may, in some embodiments, output audio that includes the wakeword. As another example, a sound activated electronic device is another type of sound controlled electronic device that may, in some embodiments, may be activated detection of a non-verbal sound, such as an ultrasonic, subsonic or audible sound generated by another electronic device (e.g., sound-based communications protocol, water faucet, toilet, coffee machine, washing machine, dish washer, laboratory equipment, manufacturing equipment, automobile, garage door opener, etc.), pet/animal (e.g., barking), person/animal interacting with objects (e.g., glass breaking, door closing, footsteps on floor, etc.), etc.

For a voice activated electronic device, spoken user commands may be prefaced by a wakeword, also referred to as a trigger expression, wake expression, or activation word. In response to the voice activated electronic device detecting the wakeword, the voice activated electronic device is configured to detect and interpret any words that subsequently follow the detected wakeword as actionable inputs or commands. If, however, the voice activated electronic device also outputs audio data that, itself, includes the wakeword, this occurrence may inadvertently activate the voice activated electronic device, causing the voice activated electronic device begin processing audio input data. This errant activation may also cause the audio data to stop being outputted, thereby requiring the individual to again provide the necessary command to cause the voice activated electronic device to restart the audio data to be outputted.

A sound activated electronic device may operate in a similar manner with the exception that the trigger expression is a non-verbal sound. For example, the sound of glass shattering or the sound of a door opening may be used as a non-verbal sound trigger. As an illustrative example, a radio show that includes the sound of glass shattering and the show is outputted by, or in the general vicinity of, the sound activated electronic device having the sound of glass shattering set as its trigger, the occurrence of this sound may erroneously cause the functionality of the sound activated electronic device to be activated.

The disruption of the output of the audio data, and the steps needed to have the audio data continued to be played thereafter may detract from a user's experience with the voice or sound activated electronic device. By more accurately being able to determine when audio output data could cause the functionality of the voice or sound activated electronic device to be activated, the aforementioned disruptions can be mitigated, providing a greater, and more seamless, user experience. Accordingly, while much of the discussion herein relates to a voice activated device, the concepts can be applied to other types of sound-based activations of a device.

In some embodiments, audio data representing a response (e.g., a response to the actionable inputs or commands detected and interpreted by a voice activated electronic device), sent by a backend system, may be received by a voice activated electronic device. The response may, for example, be speech converted from text, or it may be a portion of an audio file (e.g., a song or audio from a video). The response may also, as another example, be content that is streamed to a voice activated electronic device, such as link/URL that opens up a streaming channel of data received in packets over time (e.g., a few seconds of content is downloaded as opposed to an entire file), however video files, or any other type of data structure, may be used. The response may, for example, be audio data representing speech including a sentence or a phrase, which may include one or more words or phonemes. The received audio data may also include data tags corresponding to each word within the response. The data tags may indicate to the voice activated electronic device, amongst other features: (i) what a particular word within the response is (e.g., a word identifier), and/or (ii) a temporal location (e.g., a start/end time) of where that word occurs within the audio data.

Upon receipt of the audio data, the voice activated electronic device may use the data tags to compare each word within the phrase to a preset wakeword for the voice activated electronic device. The electronic device may store one or more wakewords within its local memory. If a positive match is found between a particular word from the phrase and the wakeword, the voice activated electronic device may identify that word as the wakeword. As an illustrative example, the wakeword may be the name, "Alexa," and the speech represented by the audio data may be, "My name is, Alexa." In this scenario, the comparison of the words "My," "name," "is," and "Alexa" with the wakeword "Alexa," may indicate to the voice activated electronic device that the second word, "Alexa," is the wakeword.

As mentioned above, each word's data tag may also indicate a temporal location of that word within the speech. Using this information, as well as an end time, or total time, of the speech, a time window for when the wakeword would be played by the voice activated electronic device, or would occur within the speech, may be determined. The time window, for example, may be the amount of time between a time that the wakeword begins to plays and the end time of the audio data. For example, if the word "Alexa" begins playing at time $t_1$ and the audio data ends at time $t_2$, then the time window for when the word "Alexa" plays would correspond to $\Delta t = |t_2 - t_1|$. In some embodiments, however, the window may also include a modifier, which modifies the time window by a multiplicative factor. For example, an individual may choose to play their audio at an accelerated or decelerated rate (e.g., 0.5 times, 1.5 times, etc.). In this particular scenario, the time window, $\Delta t$, would therefore correspond to the difference between the a start time, $t_1$, and an end time, $t_2$, multiplied by the modifier.

In some embodiments, the speech (e.g., "My name is Alexa"), may begin to play through one or more speakers or other audio output devices located on or proximate the voice activated electronic device. Persons of ordinary skill in the art will recognize, however, that the speech may begin playing at an earlier or later stage, as the aforementioned and foregoing calculations may be determined in parallel to the audio data being played by the voice activated electronic device.

After the time window is calculated, a hardware delay time may be determined. The hardware delay time may correspond to an internal delay time corresponding to an amount of time between when the audio data begins to be processed by the voice activated electronic device for playback, and when the speech begins to be outputted. An echoing offset time may also be determined. The echoing offset time may correspond to an amount of time between when the speech is outputted and when an echo of that audio data is detected by one or more audio input devices (e.g., microphones) on, or near, the voice activated electronic device. This may, for example, be caused by the voice activated electronic device being placed proximate to a wall or another type of reflective surface. The hardware delay time and the echoing offset time may be applied to the time window previously calculated to create a modified time window. In some embodiments, one or more additional offsets may also be calculated, such as a direct detection of the outputted audio data by the one or more audio input devices (e.g., not from an echo), or due to an internal error correction (e.g., an amount of time to account for errors in the processing time). The hardware delay time and echoing offset time may then be applied to the time window previously calculated, thereby creating a modified time window. The modified time window, in some embodiments, may be shifted by the hardware delay time and expanded by the echoing offset time.

The voice activated electronic device may monitor audio input data detected within its remote environment using one or more microphones, transducers, or other audio input devices located on, or in communication with, the voice activated electronic device. In some embodiments, portions of the audio input data that is captured may also include some or all of the previously outputted audio data. Continuing the previous example, the audio input data may also include the wakeword, "Alexa," and the voice activated electronic device may then determine whether the newly detected occurrence of the wakeword is within the modified time window. If so, the voice activated electronic device may ignore that portion of the audio input data when the wakeword occurred. For example, the audio input device may be disabled, thereby causing the subsequent speech detected after the wakeword to not be captured. As another example, speech recognition software may be disabled for a period of time after the wakeword occurs. This may allow the voice activated electronic device to disregard the occurrence of the wakeword so that the voice activated electronic device continues to output the audio data, as opposed to erroneously believing it is being activated and stopping the audio data from being outputted.

FIG. 1 is an illustrative diagram of a system for communicating with a backend system to determine portions of audio input data to ignore in accordance with various embodiments. In one exemplary non-limiting embodiment, an individual 2 may speak command 4 within a remote environment where their voice activated electronic device 10, as described in greater detail below, is located. Command 4 may be any questions, inquiry, instruction, phrase, or other set of one or more words/sounds. For example, individual 4 may say, "Alexa—Simon says, 'My name is Alexa.'" However, alternative or additional commands may include, but are not limited to, "Alexa—What is the weather like today?", or "Alexa—How far away is the Moon?". In some embodiments, the commands may include multiple instances of a wakeword (e.g., "Alexa"), such as "Alexa—Simon says, 'My name is Alexa.' Alexa—What is the weather like?"

Voice activated electronic device 10 may detect the wakeword, such as "Alexa," or "Amazon," and may interpret subsequent user speech as being directed to voice activated electronic device 10 using one or more audio input devices (e.g., one or more microphones and/or transducers). In particular, a wakeword may be detected within an audio signal detected by one or more microphones located on voice activated electronic device 10, however persons of ordinary skill in the art will recognize that the one or more microphones may alternatively be located on a separate device in communication with voice activated electronic device 10. In some embodiments, after the wakeword is detected, voice activated electronic device 10 may begin interpreting/analyzing audio until no more speech is detected by the audio input device(s). In some embodiments, voice activated electronic device 10 may capture audio for a pre-defined period of time after the wakeword is detected (e.g., 5 seconds, 10 seconds, 30 seconds, etc.). However, in other embodiments, voice activated electronic device 10 may cyclically capture audio for pre-defined amounts of time (e.g., 5 seconds, 10 seconds, 15 seconds, etc.), and may delete that captured audio so long as the wakeword is not determined to be included in that particular time period.

As used herein, the term "wakeword" may also correspond to a "keyword" or "key phrase," an "activation word" or "activation words," or a "trigger," "trigger word," or "trigger expression." Persons of ordinary skill in the art will recognize that the aforementioned wakeword, "Alexa," is merely exemplary, and any word (e.g., "Amazon"), series of words (e.g., "Wake Up" or "Hello, Alexa") may be used as the wakeword. Furthermore, the wakeword may be set or programmed by individual 2, and, in some embodiments, voice activated electronic device 10 may have more than one wakeword (e.g., two or more different wakewords) that may each activate voice activated electronic device 10. Furthermore, the trigger that is used, such as the wakeword, to activate voice activated electronic device 10 may be any series of temporally related sounds.

In some embodiments, the trigger may be a non-verbal sound. For example, the sound of a door opening, an alarm going off, glass breaking, a telephone ringing, or any other sound may alternatively be user to activate device 10. In this particular scenario, detection of the non-verbal sound by device 10, which alternatively may be described as a sound activated electronic device, which may be substantially similar to voice activated electronic device 10, may cause a certain action or response to occur. For example, if the sound of a door opening is detected, which is also the sound activated device's trigger, that detected trigger may cause a burglar alarm to turn on.

The captured audio may be sent to backend system 100 from voice activated electronic device 10 in the form of initial file 6. Initial file 6 may include the recorded audio data representing command 4, as well as one or more pieces of additional data, such as a time and/or date that command 4 was said, a location of voice activated electronic device 10 (e.g., a GPS location), an IP address associated with voice activated electronic device 10, a type of device that voice activated electronic device 10 is, or any other information, or any combination. For example, when individual 2 says command 4, voice activated electronic device 10 may obtain a GPS location of device 10 to determine a location of individual 2 as well as a time/date (e.g., hour, minute, second, day, month, year, etc.) when command 4 was made.

Initial file 6 may be transmitted over a network, such as the Internet, to backend system 100 using any number of communications protocols. For example, Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between voice activated electronic device 10 and backend system 100. In some embodiments, voice activated electronic device 10 and backend system 100 may communicate with one another via a web browser using HTTP. Various additional communication protocols may be used to facilitate communications between voice activated electronic device 10 and backend system 100 including, but not limited to, Wi-Fi (e.g., 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Backend system 100 may include one or more servers, each in communication with one another and/or voice activated electronic device 10. Each server within backend system 100 may be associated with one or more databases or processors, capable of storing, retrieving, processing, analyzing, and/or generating data to be provided to voice activated electronic device 10. For example, backend system 100 may include one or more game servers for storing and processing information related to different game (e.g., "Simon Says," karaoke, etc.). As another example, backend system 100 may include one or more weather servers for storing weather information and/or providing weather information to voice activated electronic device 10. Backend system 100 may, in some embodiments, correspond to a collection of servers located within a remote facility, and individuals may store data on backend system 100 and/or communicate with backend system 100 using one or more of the aforementioned communications protocols.

Upon receipt of initial file 6, backend system 100 may perform various actions based on, and in response to, command 4. For instance, backend system 100 may convert the audio data representing command 4 into text, and may use the text to determine the word(s) within command 4. Furthermore, backend system 100 may also include automatic speech recognition and natural language understanding function thereon to process and analyze the audio data representing command 4. After the word(s) are determined, an appropriate server or servers of backend system 100 may be accessed to retrieve or obtain a response to command 4 from a specific server (or skill). Backend system 100 may also include one or more computing devices in communication with the one or more servers of backend system 100, and may include one or more processors, communication circuitry (including any circuitry capable of using any of the aforementioned communications protocols), and/or storage/memory. Backend system 100 may also include various modules that store software, hardware, logic, instructions, and/or commands for cloud-based information system 100 to perform, such as, for example, a speech-to-text ("STT") module, a text-to-speech ("TTS") module. A more detailed description of backend system 100 is provided below.

The converted text may be analyzed to determine what command, action, or instruction individual 2 said within command 4. While techniques for transcribing speech into text are well known in the art and need not be described in further detail herein, any suitable computer implemented speech to text technique may be used to convert the received audio signal(s) into text, such as SOFTSOUND® speech processing technologies available from the Autonomy Corporation, which is headquartered in Cambridge, England, United Kingdom. In some embodiments, one or more filters may be applied to the received audio data to reduce or minimize extraneous noise, however this is not required.

After the audio data is analyzed, speech, such as a response or answer, is generated and converted from text into audio data representing the speech using TTS techniques. While techniques for transcribing text into speech are well known in the art and need not be described in further detail herein, any suitable computer implemented text to speech technique may be used to convert the text into speech, such as SOFTSOUND® speech processing technologies available from the Autonomy Corporation, which is headquartered in Cambridge, England, United Kingdom. The audio data representing the speech may then be transmitted, along with one or more data tags (e.g., word identifiers, temporal identifiers), back to voice activated electronic device 10 in the form of return file 8. The data tags may indicate each word within audio data representing response 12, as well as an amount of time between the beginning of the speech and the beginning of when word included within the speech will be outputted by voice activated electronic device. In some embodiments, the data tag or tags may also indicate an amount of time that it takes for that word to be outputted by voice activated electronic device 10. The data tag(s), such as the word identifiers and temporal identifiers (e.g., start/end time of a word within the speech) may be sent within return file 8 such that they are processed by voice activated electronic device 10 prior to the speech being outputted. In some embodiments, the data tag(s) may be arranged such that they are processed after the speech is outputted. Further still, the data tag(s) may be interleaved between the words included within the speech.

The audio data representing the speech, such as response 12, may then be outputted through one or more speakers on voice activated electronic device 10. For example, voice activated electronic device 10 may output speech including response 12, such as "My name is Alexa." As mentioned previously, response 12 may, in some embodiments, include the wakeword, which in this particular scenario may be "Alexa." As described in greater detail below, voice activated electronic device 10 includes one or more microphones as well as one or more speakers. The close proximity of the microphones and speakers may, thus, cause the microphones to detect the wakeword within response 12, and also detect an echo of response 12 reflecting off a surface in the remote environment where voice activated electronic device 10 is located. The detection of the wakeword by voice activated electronic device 10 from response 12 may cause various functions of voice activated electronic device 10 to be activated, thereby beginning to capture and/or process audio input data, and send that audio input data to backend system 100.

In this scenario, voice activated electronic device 10 may determine that a portion of the newly detected audio input data that includes the new occurrence of the wakeword is to be ignored. For example, portion 30 of response 12, when detected by the one or more microphones on voice activated electronic device 10, may be ignored while portion 20 of response 12 may not be ignored. By ignoring portion 30, voice activated electronic device 10 may not be activated by the detection of the wakeword, "Alexa," and therefore would not begin to capture and/or begin processing audio input data to be sent to backend system 100, as well as not stopping the speech from being outputted.

In some embodiments, voice activated electronic device 10 may ignore the wakeword only if it is detected within a specific time window. The time window may be calculated by voice activated electronic device 10 and/or backend system 100 based on one or more of the data tags for the words within response 12 and/or one or more offsets or delays. For example, a time window for when the wakeword "Alexa" is to be outputted within response 12 may be calculated by voice activated electronic device 10 or backend system 100. This time window may then be modified based on a hardware delay time for voice activated electronic device 10, as well as an echoing offset caused by an echo of the audio that is outputted by voice activated electronic device 10 being detected by one or more microphones/transducers of voice activated electronic device 10. Thus, if the wakeword is detected within the modified time window (e.g., portion 30), it may be ignored, whereas if the wakeword is detected outside the time window (e.g., at a time before the beginning of the modified time window or at a time after the end of the modified time window), then it may not be ignored.

Figure 2:
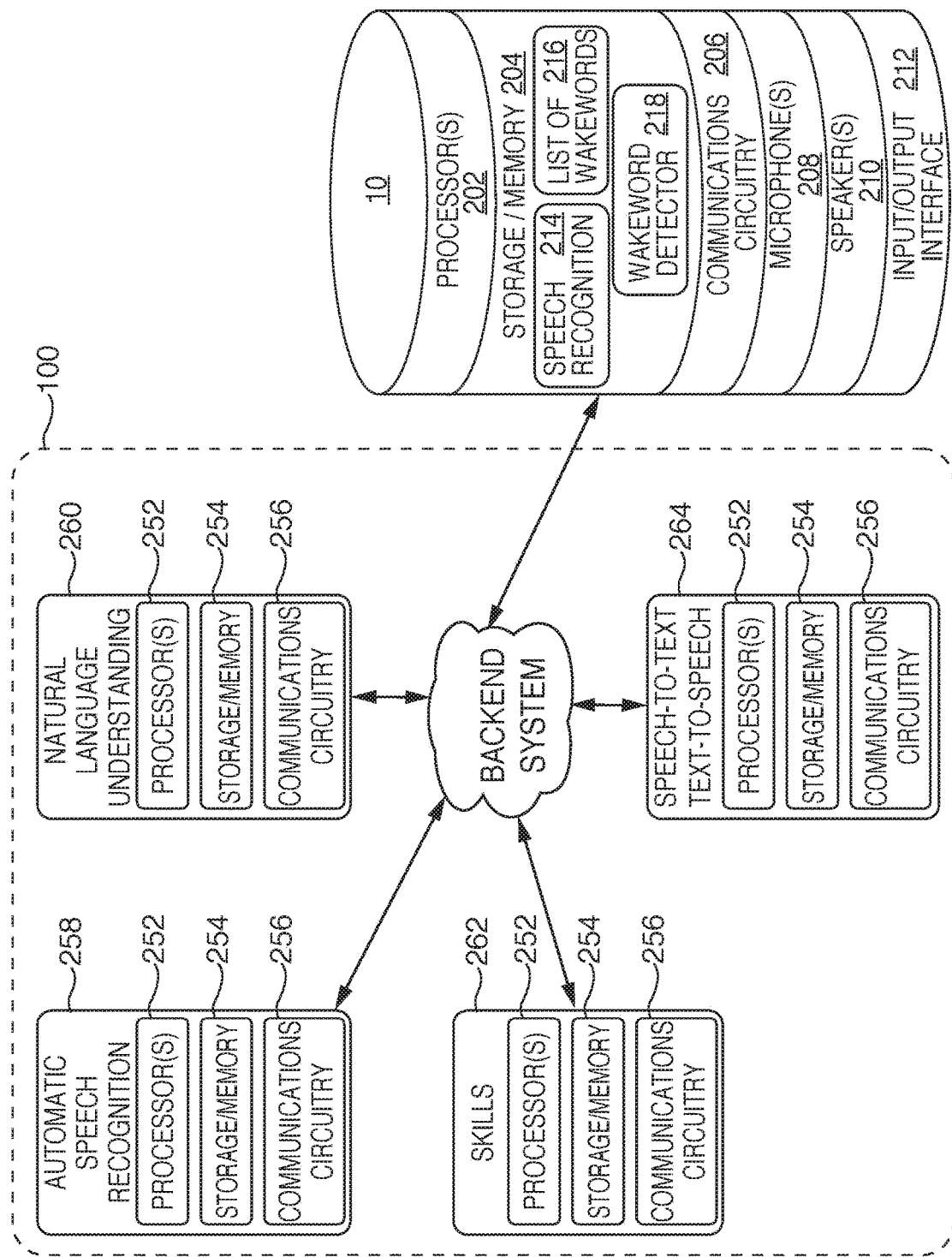
FIG. 2 is an illustrative diagram of the system of FIG. 1 in accordance with various embodiments.

FIG. 2 is an illustrative diagram of the system of FIG. 1 in accordance with various embodiments. Voice activated electronic device 10, in some embodiments, may correspond to any type of electronic device capable of activated in response to detecting a specific sound. Voice activated electronic device 10 may, in some embodiments, after detecting the specific sound (e.g., a wakeword or trigger), recognize commands (e.g., audio commands, inputs) within captured audio, and may perform one or more actions in response to the received commands. Various types of electronic devices may include, but are not limited to, desktop computers, mobile computers (e.g., laptops, ultrabooks), mobile phones, smart phones, tablets, televisions, set top boxes, smart televisions, watches, bracelets, display screens, personal digital assistants ("PDAs"), smart furniture, smart household devices, smart vehicles, smart transportation devices, and/or smart accessories. In some embodiments, voice activated electronic device 10 may be relatively simple or basic in structure such that no mechanical input option(s) (e.g., keyboard, mouse, trackpad) or touch input(s) (e.g., touchscreen, buttons) may be provided. For example, voice activated electronic device 10 may be able to receive and output audio, and may include power, processing capabilities, storage/memory capabilities, and communication capabilities.

Voice activated electronic device 10 may include a minimal number of input mechanisms, such as a power on/off switch, however primary functionality, in one embodiment, of voice activated electronic device 10 may solely be through audio input and audio output. For example, voice activated electronic device 10 may listen for a wakeword by continually monitoring local audio. In response to the wakeword being detected, voice activated electronic device 10 may establish a connection with backend system 100, send audio data to backend system 100, and await/receive a response from backend system 100. In some embodiments, however, non-voice activated devices may also communicate with backend system 100 (e.g., push-to-talk devices).

Voice activated electronic device 10 may include one or more processors 202, storage/memory 204, communications circuitry 206, one or more microphones 208 or other audio input devices (e.g., transducers), one or more speakers 210 or other audio output devices, as well as an optional input/output ("I/O") interface 212. However, one or more additional components may be included within voice activated electronic device 10, and/or one or more components may be omitted. For example, voice activated electronic device 10 may include a power supply or a bus connector. As another example, voice activated electronic device 10 may not include an I/O interface. Furthermore, while multiple instances of one or more components may be included within voice activated electronic device 10, for simplicity only one of each component has been shown.

Processor(s) 202 may include any suitable processing circuitry capable of controlling operations and functionality of voice activated electronic device 10, as well as facilitating communications between various components within voice activated electronic device 10. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("AS-SPs"), system-on-chip systems ("SOCs"), and/or complex programmable logic devices ("CPLDs"). Furthermore, each of processor(s) 202 may include its own local memory, which may store program modules, program data, and/or one or more operating systems. However, processor(s) 202 may run an operating system ("OS") for voice activated electronic device 10, and/or one or more firmware applications, media applications, and/or applications resident thereon.

Storage/memory 204 may include one or more types of storage mediums such as any volatile or non-volatile memory, or any removable or non-removable memory implemented in any suitable manner to store data on voice activated electronic device 10. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include one or more modules and/or databases, such as speech recognition module 214, list of wakewords database 216, and wakeword detection module 218. Speech recognition module 214 may, for example, include an automatic speech recognition ("ASR") component that recognizes human speech in detected audio. Speech recognition module 214 may also include a natural language understanding ("NLU") component that determines user intent based on the detected audio. Also included within speech recognition module 214 may be a text-to-speech ("TTS") component capable of converting text to speech to be outputted by speaker(s) 210, and/or a speech-to-text ("STT") component capable of converting received audio signals into text to be sent to backend system 100 for processing.

List of wakewords database 216 may be a database stored locally on voice activated electronic device 10 that includes a list of a current wakeword for voice activated electronic device 10, as well as one or more previously used, or alternative, wakewords for voice activated electronic device. In some embodiments, individual 2 may set or program a wakeword for voice activated electronic device 10. The wakeword may be programmed directly on voice activated electronic device 10, or a wakeword or words may be set by the individual via a backend system application that is in communication with backend system 100. For example, individual 2 may use their mobile device having the backend system application running thereon to set the wakeword. The specific wakeword may then be communicated from the mobile device to backend system 100, which in turn may send/notify voice activated electronic device 10 of the individual's selection for the wakeword. The selected activation may then be stored in database 216 of storage/memory 204.

Wakeword detection module 218 may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a threshold to determine whether the wakeword will be declared as having been spoken.

In some embodiments, a keyword spotter may be use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice activated electronic device 10 may then begin transmitting the audio signal to backend system 100 for detecting and responds to subsequent utterances made by individual 2.

Communications circuitry 206 may include any circuitry allowing or enabling voice activated electronic device 10 to communicate with one or more devices, servers, and/or systems. For example, communications circuitry 206 may facilitate communications between voice activated electronic device 10 and backend system 100. Communications circuitry 206 may use any communications protocol, such as any of the previously mentioned exemplary communications protocols. In some embodiments, voice activated electronic device 10 may include an antenna to facilitate wireless communications with a network using various wireless technologies (e.g., Wi-Fi, Bluetooth®, radiofrequency, etc.). In yet another embodiment, voice activated electronic device 10 may include one or more universal serial bus ("USB") ports, one or more Ethernet or broadband ports, and/or any other type of hardwire access port so that communications circuitry 206 allows voice activated electronic device 10 to communicate with one or more communications networks.

Voice activated electronic device 10 may also include one or more microphones 208 and/or transducers. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, voice activated electronic device 10 may include multiple microphones (e.g., four, seven, ten, etc.) placed at various positions about voice activated electronic device 10 to monitor/capture any audio outputted in the environment where voice activated electronic device 10 is located. The various microphones 208 may include some microphones optimized for distant sounds, while some microphones may be optimized for sounds occurring within a close range of voice activated electronic device 10.

Voice activated electronic device 10 may further include one or more speakers 210. Speaker(s) 210 may correspond to any suitable mechanism for outputting audio signals. For example, speaker(s) 210 may include one or more speaker units, transducers, arrays of speakers, and/or arrays of transducers that may be capable of broadcasting audio signals and or audio content to a surrounding area where voice activated electronic device 10 may be located. In some embodiments, speaker(s) 210 may include headphones or ear buds, which may be wirelessly wired, or hard-wired, to voice activated electronic device 10, that may be capable of broadcasting audio directly to individual 2.

In some embodiments, one or more microphones 208 may serve as input devices to receive audio inputs, such as speech from individual 2. Voice activated electronic device 10, in the previously mentioned embodiment, may then also include one or more speakers 210 to output audible responses. In this manner, voice activated electronic device 10 may function solely through speech or audio, without the use or need for any input mechanisms or displays.

In one exemplary embodiment, voice activated electronic device 10 includes I/O interface 212. The input portion of I/O interface 212 may correspond to any suitable mechanism for receiving inputs from a user of voice activated electronic device 10. For example, a camera, keyboard, mouse, joystick, or external controller may be used as an input mechanism for I/O interface 212. The output portion of I/O interface 212 may correspond to any suitable mechanism for generating outputs from electronic device 10. For example, one or more displays may be used as an output mechanism for I/O interface 212. As another example, one or more lights, light emitting diodes ("LEDs"), or other visual indicator(s) may be used to output signals via I/O interface 212 of voice activated electronic device 10. In some embodiments, one or more vibrating mechanisms or other haptic features may be included with I/O interface 212 to provide a haptic response to individual 2 from device 10. Persons of ordinary skill in the art will recognize that, in some embodiments, one or more features of I/O interface 212 may be included in a purely voice activated version of electronic device 10. For example, one or more LED lights may be included on voice activated electronic device 10 such that, when microphone(s) 208 receive audio from individual 2, the one or more LED lights become illuminated signifying that audio has been received by voice activated electronic device 10. In some embodiments, I/O interface 212 may include a display screen and/or touch screen, which may be any size and/or shape and may be located at any portion of voice activated electronic device 10. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

System 200 also includes backend system 100, as mentioned previously, which may be in communication with voice activated electronic device 10. Backend system 100 includes various components and modules including, but not limited to, automatic speech recognition ("ASR") module 258, natural language understanding ("NLU") module 260, skills module 262, and speech-to-text ("STT") and text-to-speech ("TTS") module 264. In some embodiments, backend system 100 may also include computer readable media, including, but not limited to, flash memory, random access memory ("RAM"), and/or read-only memory ("ROM"). Backend system 100 may also include various modules that store software, hardware, logic, instructions, and/or commands for cloud-based information system 100, such as, a speaker identification ("ID") module, a user profile module, or any other module, or any combination thereof. As shown in FIG. 2, speech-to-text functionality and text-to-speech functionality may be combined into a single module capable of performing both STT and TTS processing, however separate TTS and STT modules may, alternatively, be used.

ASR module 258 may be configured such that it recognizes human speech in detected audio, such as audio captured by voice activated electronic device 10, which is then transmitted to backend system 100. ASR module 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions of the latter may apply. NLU module 260 may be configured such that it determines user intent based on the detected audio received from voice activated electronic device 10. NLU module 260 may include processor(s) 252, storage/memory 254, and communications circuitry 256.

Skills module 262 may, for example, correspond to various action specific skills or servers capable of processing various task specific actions. Skills module 262 may further correspond to first party applications and/or third party applications operable to perform different tasks or actions. For example, based on the context of audio received from voice activated electronic device 10, backend system 100 may use a certain application or skill to retrieve or generate a response, which in turn may be communicated back to voice activated electronic device 10. Skills module 262 may include processor(s) 252, storage/memory 254, and communications circuitry 256. As an illustrative example, skills 262 may correspond to one or more game servers for storing and processing information related to different game (e.g., "Simon Says," karaoke, etc.). As another example, skills 262 may include one or more weather servers for storing weather information and/or providing weather information to voice activated electronic device 10.

STT/TTS module 264 may employ various speech-to-text and/or text-to-speech techniques, which are described in greater detail above. However, techniques for transcribing speech into text are well known in the art and need not be described in further detail herein, any suitable computer implemented speech to text technique may be used to convert the received audio signal(s) into text, such as SOFTSOUND® speech processing technologies available from the Autonomy Corporation, which is headquartered in Cambridge, England, United Kingdom. STT/TTS module 264 may also include processor(s) 252, storage/memory 254, and communications circuitry 256.

Persons of ordinary skill in the art will recognize that although each of ASR module 258, NLU module 260, skills module 262, and STT/TTS module 264 include instances of processor(s) 252, storage/memory 254, and communications circuitry 256, those instances of processor(s) 252, storage/memory 254, and communications circuitry 256 within each of ASR module 258, NLU module 260, skills module 262, and STT/TTS module 264 may differ. For example, the structure, function, and style of processor(s) 252 within ASR module 258 may be substantially similar to the structure, function, and style of processor(s) 252 within NLU module 260, however the actual processor(s) 252 need not be the same entity.

Figure 3:
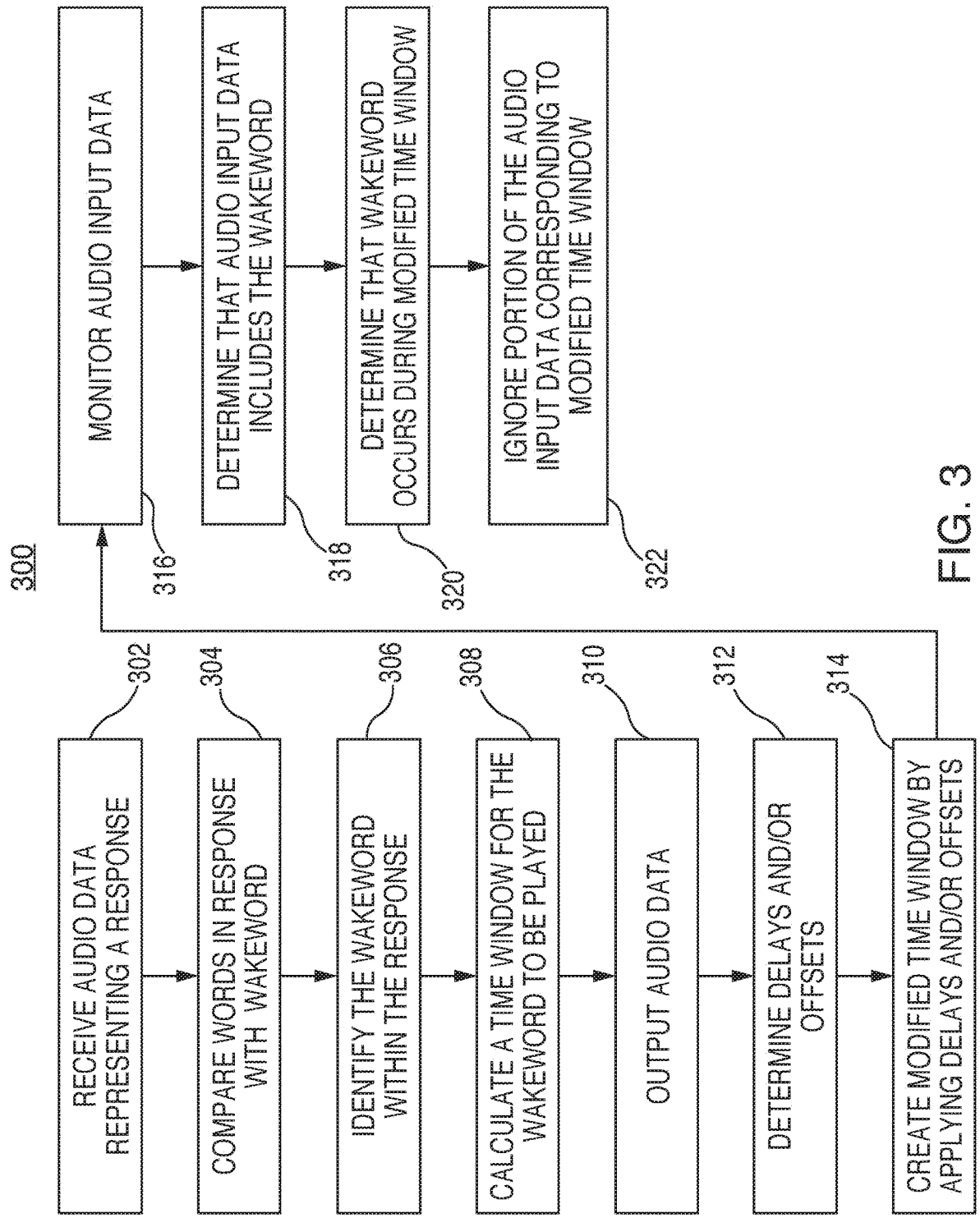
FIG. 3 is an illustrative flowchart of a process for determining portions of audio input data to ignore in accordance with various embodiments.

FIG. 3 is an illustrative flowchart of a process for determining portions of audio input data to ignore in accordance with various embodiments. Process 300 may begin at step 302. At step 302, audio data representing speech, such as response 12, may be received by voice activated electronic device 10. For example, backend system 100 may send return file 8 to voice activated electronic device 10. Return file 8 may include audio data representing response 12 to be outputted by speaker(s) 210, as well as one or more data tags indicating a temporal location (e.g., start time/end time) of each word within response 12, as well as a word identifier unique to of each word within response 12. In some embodiments, the data tags for each word may be interleaved within the audio data, however persons of ordinary skill in the art will recognize that the data tags may also be located at a beginning of the audio data or an end of the audio data.

At step 304, a comparison may be performed between the word identifier corresponding to each word within response 12 and a pre-set wakeword, or series of temporally related sounds, for voice activated electronic device 10, which may be stored in storage/memory 204 (e.g., list of wakewords database 216). Using the data tags (e.g., the word identifier), the words within response 12 may be analyzed against the wakeword to determine if that particular word is the wakeword. If the wakeword is included within response 12, it may then be identified at step 306. For example, if the wakeword is "Alexa," when the words within response 12 are compared against the wakeword, a positive (e.g., logical true) match will be identified.

At step 308, a time window for when the wakeword will be outputted by speaker(s) 210 may be calculated. The various data tags may, as mentioned previously, include timestamps or temporal locations of where, temporally, each word is located within response 12 (e.g., a start time and an end time for each word). Thus, the data tags may enable voice activated electronic device 10 to know how long after response 12 begins to play through speaker(s) 210, a certain particular word will begin to output, as well as an amount of time that it takes for that to play. For example, the word "Alexa" may start at a time 200 milliseconds from the beginning of response 12, and may end 50 milliseconds later. In this particular scenario, the time window is 50 milliseconds, beginning at a time 200 milliseconds after response 12 begins playing, and ending at a time 250 milliseconds after response 12 plays.

At step 310, response 12 may begin playing through speaker(s) 210. In other words, sound or audio signals may begin to be transmitted from speaker(s) 210 into the remote environment where voice activated electronic device 10 is located. While step 310 within process 300 occurs after the time window is calculated, persons of ordinary skill in the art will recognize that the speech may begin playing earlier or later. For example, step 310 may, in some embodiments, occur after step 302 or after step 314, and the aforementioned is merely exemplary. Furthermore, persons of ordinary skill in the art will recognize that portions of the audio data may begin playing at a substantially same time as a time when the audio data is received by voice activated electronic device 10, and therefore the identification of the wakeword and calculation of the time window may occur in parallel, or substantially in parallel, with the outputting of the audio data.

At step 312, one or more delays and/or offsets may be determined including, but not limited to, hardware delays and acoustic echoing offsets. Hardware delays may, for example, correspond to internal delays for voice activated electronic device 10 corresponding to an amount of time between a time when the audio data received from backend system 100 begins to be processed for audio playback, and when the speech that the audio data represents begins to play through speaker(s) 210. Acoustic echoing offsets may, for example, correspond to an offset that accounts for outputted sound waves (e.g., response 12) reflecting off a surface, such as a wall or ceiling, and then being detected by microphone(s) 208. Hardware delays and acoustic echoing offsets are described in greater detail below with regards to FIGS. 5A and 5B, respectively. Persons of ordinary skill in the art will also recognize that the hardware delays and acoustic echoing offsets may be calculated prior to receipt of the audio data, and therefore the calculated time window of step 308, in some embodiments, may include these delays/offsets. In this particular scenario, steps 312 and 314 may then be omitted from process 300. Furthermore, in some embodiments, one or more additional offsets/delays may be determined. For example, an error correction offset may be calculated based on an expected error in the hardware delay, echoing offset, and/or other factors. The error correction, for instance, may account for any potential errors that may arise within the other calculated offsets or general detection features, such that a minor error in one computation does not vastly impact the usage of the other offsets.

At step 314, the various delays and offsets determined at step 312 may be applied to the time window calculated previously at step 308 to create a modified time window. The modified time window may indicate a more precise timing for when an occurrence of wakeword included within response 12 may be detected by microphone(s) 208. This may increase the ability of voice activated electronic device 10 to recognize inadvertent instances of the wakeword that do not correspond to individual 2 attempting to activate voice activated electronic device 10. As an illustrative example, a hardware delay may cause the time window to be shifted such that audio data representing the wakeword would be expected to be received by microphone(s) 208 at a latter point in time. Continuing this example, the acoustic echoing offset may further cause the time window to be expanded to account for reflecting sound wave of the wakeword from response 12 to be detected by voice activated electronic device 10.

At step 316, microphone(s) 208 may monitored audio input data. The audio input data may, in some embodiments, begin to be detected at a substantially same time as the audio data is outputted by speaker(s) 210. The monitoring of the audio input data may check for occurrences of the wakeword within the audio input data. For example, the audio input data may be converted to text using speech recognition module 214. The text may then be compared against list of wakewords database 216 to determine if any of the words within the converted text are the wakeword.

At step 318, a determination may be made that a word (or words) from within the text is (are) the wakeword. In some embodiments, wakeword detection module 318 may include an expression detector configured to analyze the audio signal detected by microphone(s) 208 to produce a score indicating a likelihood that the wakeword is represented within the detected audio signal. The expression detector may then compare that score to a threshold to determine whether the wakeword will be declared as having been spoken. If so, a positive output, or logical true, may be provided to processor(s) 202 to indicate the wakeword is present within the audio input data. In response, another determination may be made, at step 320, to check if the wakeword detected within the text occurs within the modified time window. For example, based on the hardware delays and echoing offsets, the expected time period for when the wakeword may be detected by microphone(s) 208 of voice activated electronic device 10 may be between 225 milliseconds and 300 milliseconds after the audio data begins to play. Detection of the wakeword (e.g., "Alexa") would therefore correspond to the wakeword, "Alexa," being detected within the audio input data in between 225 and 300 milliseconds after the audio data begins. Therefore, the start time of when the wakeword begins within the received audio data would be approximately equal at, or after, the start time of the modified time window, but approximately equal to, or before, the end of the modified time window.

In response to determining that the wakeword is detected within the modified time window, at step 320, voice activated electronic device 10 may ignore that portion of the audio input data including the wakeword. For example, speech recognition module 214 may detect the wakeword (e.g., "Alexa" or "Amazon") captured by microphone(s) 208 within the modified time window and may ignore that occurrence of the wakeword because it fell within the modified time window. As another example, wakeword detection may be disabled during the modified time window such that audio signals are not analyzed to determine whether or not they are the wakeword.

In some embodiments, ignoring the portion of the audio input data may, alternatively, correspond to voice activated electronic device 10 not being activated, and therefore not beginning to record audio data, in response to the wakeword being detected within the modified time window. In some embodiments, ignoring the portion of the audio input data may also correspond to instructing backend system 100 to not analyze that portion of audio input data. As another example, an instruction for speech recognition module 214 to shut off may instead be provided by voice activated electronic device 10, whereby microphone(s) 208 still capture audio signals, however no analysis of those audio signals to determine what words or sounds they include is performed.

Still further, in another embodiment, if the wakeword is detected within the modified time window, voice activated electronic device 10 may have power shut off to microphone(s) 208 such that no additional data may be captured. For example, the shut off may be a removal of power (e.g., electrical current) to microphone(s) 208, thus disabling microphone(s) 208 from being able to capture audio signals. As another example, a software command to shut off microphone(s) 208 may correspond to microphone(s) 208 still receiving electrical current, but being configured to not capture audio signals. If, however, the wakeword is detected outside of the modified time window, it may not, in some embodiments, be ignored by voice activated electronic device 10, as described in greater detail below.

Figure 4:
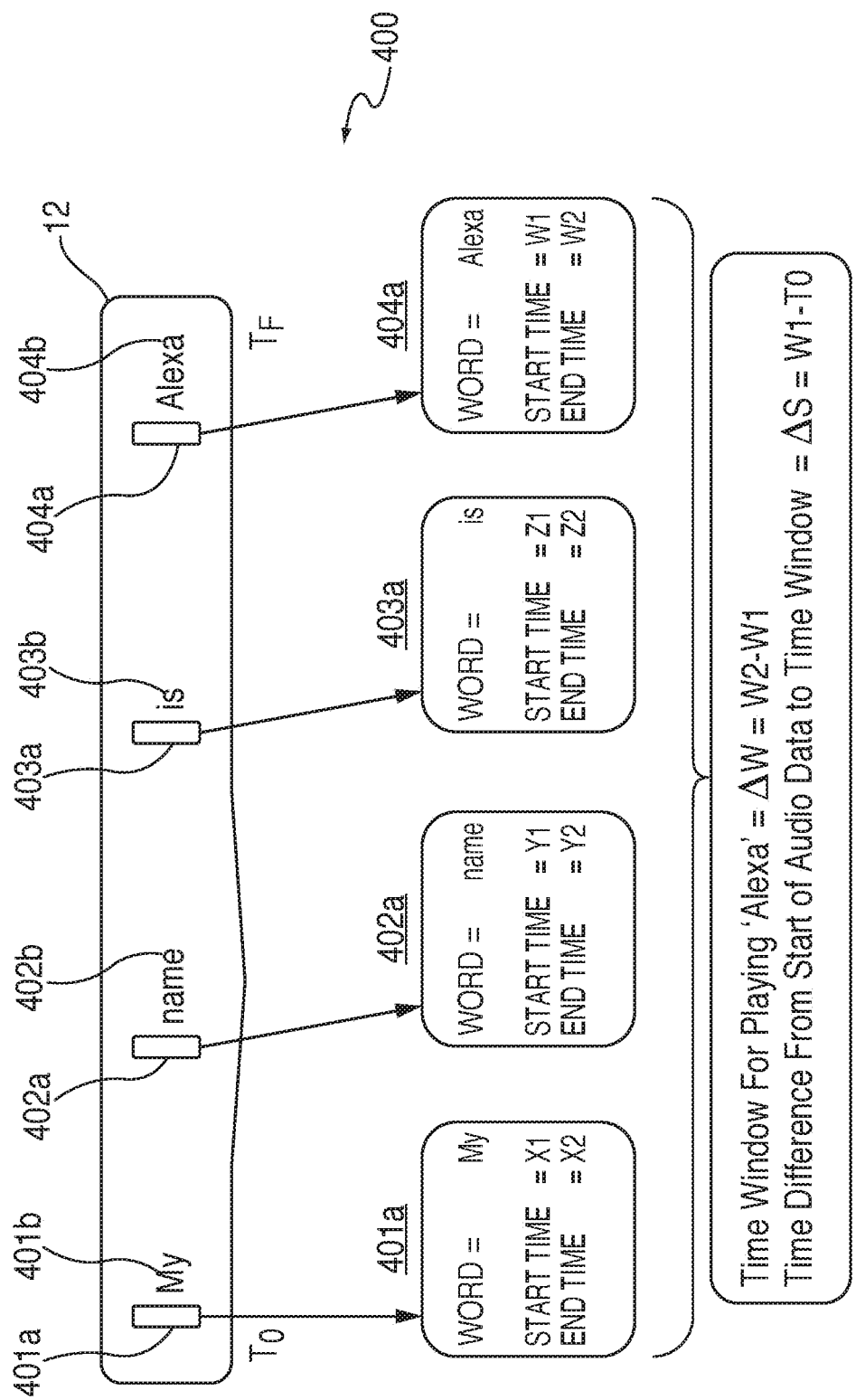
FIG. 4 is an illustrative diagram of an exemplary operation within the architecture of FIG. 1 in accordance with various embodiments.

FIG. 4 is an illustrative diagram of an exemplary operation within the architecture of FIG. 1 in accordance with various embodiments. Scenario 400 includes response 12, which includes words 401b-404b and data tags 401a-404a. In the non-limiting exemplary embodiment, each of words 401b, 402b, 403b, and 404b has a corresponding data tag 401a, 402a, 403a, and 404a, respectively, which is interleaved within response 12 such that data tag 401a, for example, is received by voice activated electronic device 10 prior to word 401b. However, in some embodiments, each of data tags 401a-404a may be transmitted at a beginning of response 12, or at an end of response 12. Furthermore, persons of ordinary skill in the art will recognize that more or fewer data tags may be used, and data tag corresponding to each word within response 12 is merely illustrative.

As mentioned previously, data tags 401a-404a may include various pieces of information. In some embodiments, data tags 401a-404a may include word identifiers unique to each words within response 12, which identify that particular word to voice activated electronic device 10. Data tags 401a-404a may also include temporal locations of that word (e.g., a start time and an end time of that word) within response 12. As an illustrative, non-limiting example, data tag 401a may indicate that response 12 includes the word, "My," which begins to play at a time X1, and ends at a time X2. Similarly, data tag 402a may indicate that response 12 includes the word, "name," which begins to play at time Y1, and ends at time Y2; data tag 403a may indicate that response 12 includes the word, "is," which begins at time Z1, and ends at time Z2; and data tag 404a may indicate that response 12 includes the word, "Alexa," which begins at time W1, and ends at time W2.

Response 12 may, in some embodiments, have a start time T0 and an end time TF. For example, if the total time duration of response 12 is 1 second, time T0 would equal 0 seconds, and time TF would equal 1 second. In some embodiments, time X1 (e.g., the start time of the first word within response 12) may equal the start time T0 of response 12. However, this may not always be the case, as there may be delays between start time T0 for the beginning of response 12 and the start time X1 of first word 401b. For example, if additional audio is being outputted by device 10, response 12 may be temporarily held such that it does not being to play until the additional audio has finished.

In some embodiments, a time window for when the wakeword (e.g., "Alexa") will be played within response 12 may be calculated as ΔW (e.g., the difference between the starting time W1 and the end time W2). The time from the start of response 12 would begin to play and a time for when the wakeword "Alexa" would begin to play may be ΔS, which may equal the difference between the start time of response 12 (e.g., T0), and the start time of when the name "Alexa" begins to play (e.g., W1). In some embodiments, ΔW and/or ΔS may be calculated on voice activated electronic device 10, however either may alternatively be calculated by backend system 100 and transmitted to voice activated electronic device 10 within return file 8.

Figure 5A:
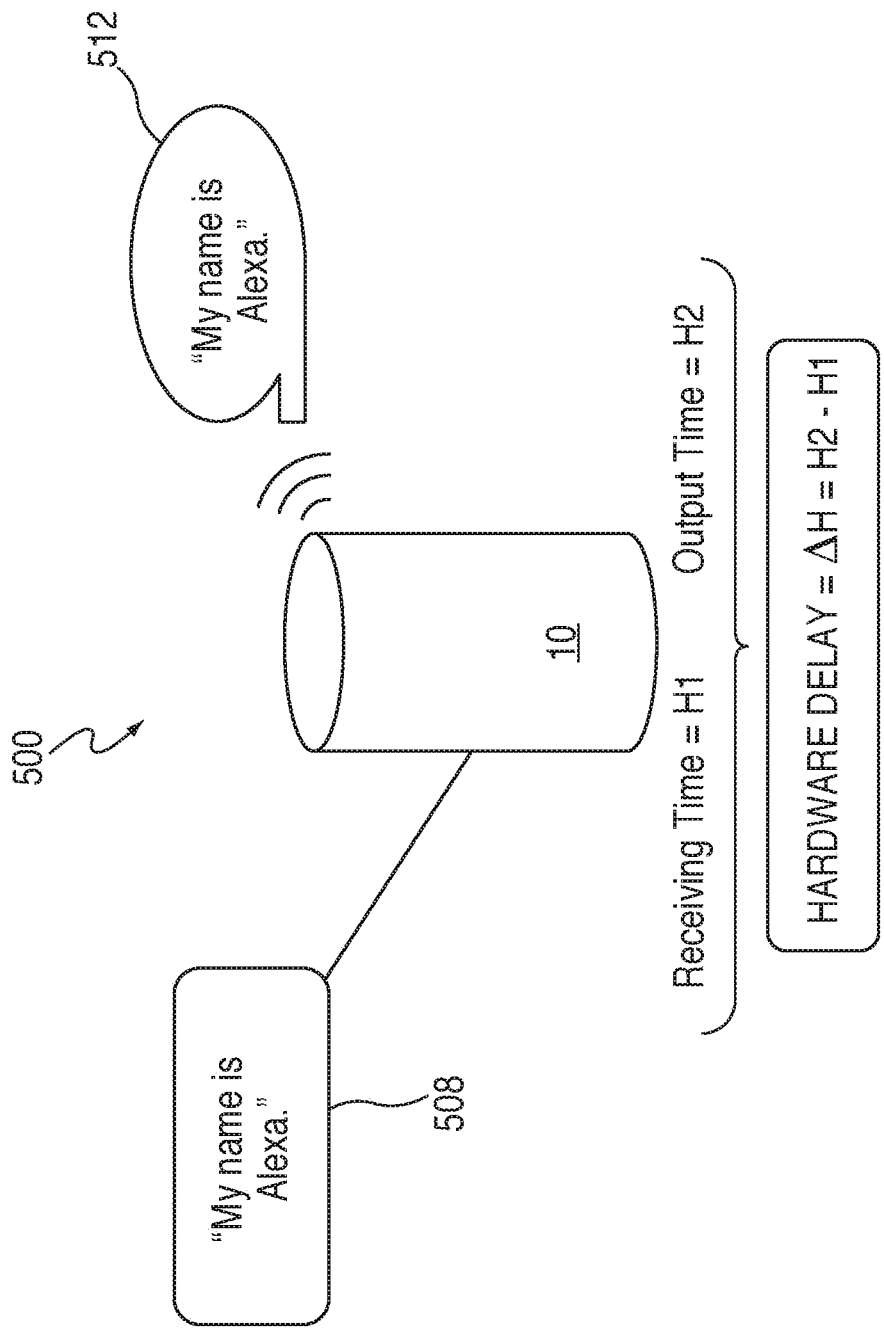
FIG. 5A is an illustrative diagram of an exemplary operation for calculating hardware delays within the architecture of FIG. 1 in accordance with various embodiments.

FIG. 5A is an illustrative diagram of an exemplary operation for determining hardware delays within the architecture of FIG. 1 in accordance with various embodiments. Scenario 500 of FIG. 5A corresponds to one exemplary embodiment of a hardware delay in relation to voice activated electronic device 10. Hardware delays, as used herein, may correspond to any delay due to processing, analyzing, or converting signals into an output, and may be a very minimal delay or a large delay. For example, hardware delays may correspond to an amount of time associated with processing audio data for playback. In some embodiment, hardware delays may be affected by a length of wire used within voice activated electronic device 10, a material of one or more components within voice activated electronic device 10, or any other constraint that may be present.

Audio data 508 representing response 512 may be received by voice activated electronic device 10. In some embodiments, response 512 may begin to be processed for audio playback at an input time H1. At a later time, H2, an audible output of response 512 may be played by speaker(s) 210. The difference between the output time H2, and the input time H1, may correspond to a hardware delay time ΔH for voice activated electronic device 10. In the illustrated non-limiting embodiment, hardware delay time ΔH may simply represent the time difference between audio input and audio output, however various other additional hardware delays may exist, and the aforementioned is merely exemplary. For example, the audio data may be received at an earlier time than when the audio data begins a process associated with performing audio playback because audio may currently be outputted by speaker(s) 210. Furthermore, persons of ordinary skill in the art will recognize that hardware delay time ΔH may be substantially small such that the time difference is not detectable by individual 2.

Figure 5B:
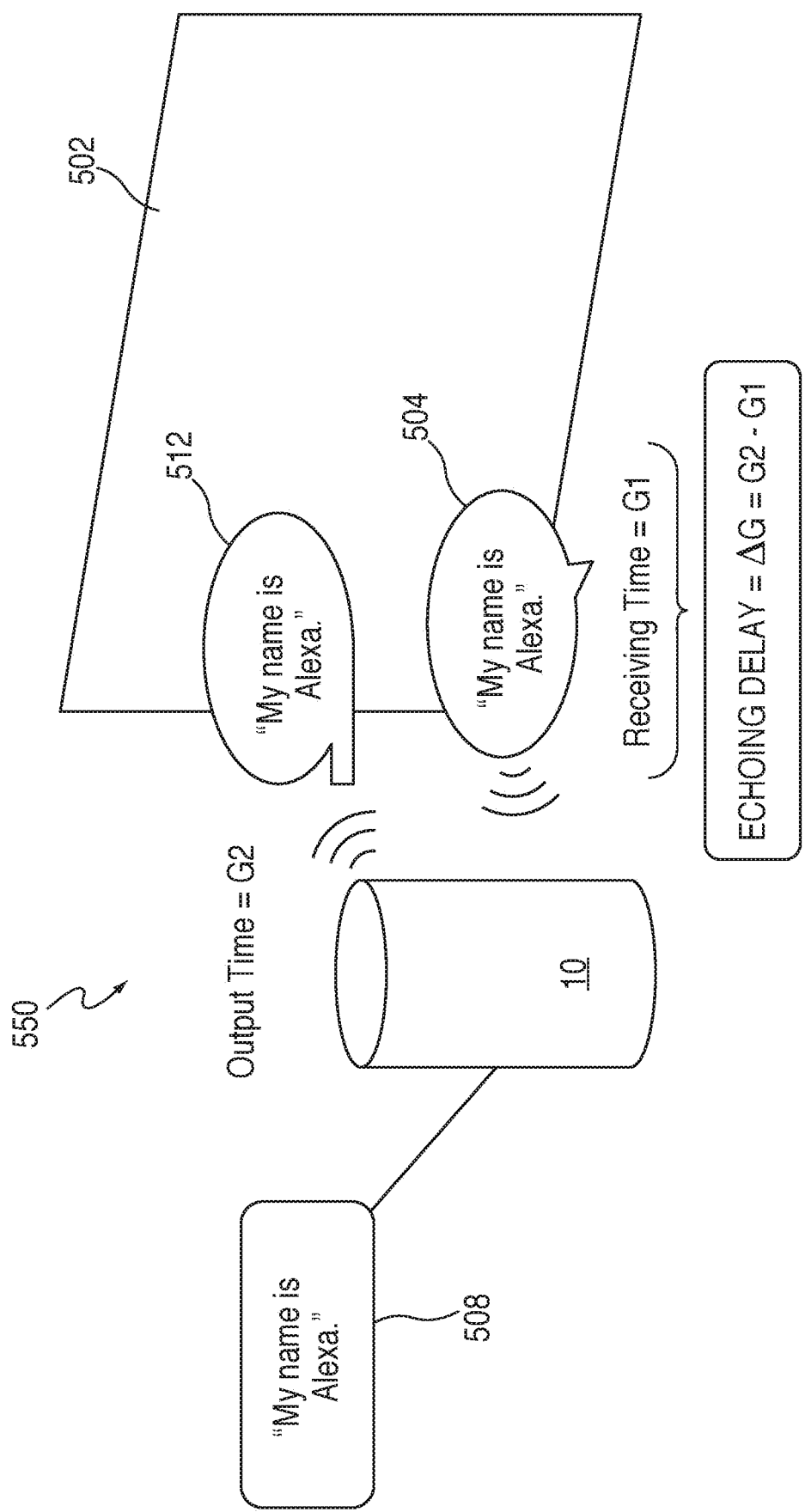
FIG. 5B is an illustrative diagram of an exemplary operation for calculating echoing offsets within the architecture of FIG. 1 in accordance with various embodiments.

FIG. 5B is an illustrative diagram of an exemplary operation for calculating echoing offsets within the architecture of FIG. 1 in accordance with various embodiments. Scenario 550 of FIG. 5B may correspond to one exemplary embodiment of an acoustic echoing offset for voice activated electronic device 10. As mentioned previously, when response 512 is outputted at time G2, the sound waves may travel within the remote environment where voice activated electronic device 10 is located. In some embodiments, the sound waves may reflect off surface 502, such as a wall or ceiling, and may travel back towards voice activated electronic device 10. Surface 502 that the sound reflects off of may be formed of any material, such as brick, glass, or plastic. Surface 502 causes a sound wave to reflect off of the surface back in a direction opposite, or substantially opposite to, the incoming sound wave's direction. In this particular scenario, portions of the reflected audio 504 may be detected by microphone(s) 208 at an audio receipt time, G1. In the non-limiting exemplary embodiment of scenario 550, the reflected audio 504 may include the wakeword (e.g., "Alexa"). If this occurs, voice activated electronic device 10 may detect the wakeword, and may believe it is being activated, thus beginning to recording the audio input data.

In some embodiments, the time that it takes for audio data representing response 512 to output and then return as reflected audio 504 may correspond to echoing offset ΔG. Offset ΔG may, for example, correspond to the difference between the output time of audio data representing response 512 (e.g., output time G2), and an audio receipt time G1 when the audio, such as reflected audio, is detected by microphone(s) 208 of voice activated electronic device 10. In some embodiments, echoing offset ΔG may be calculated using a test signal when voice activated electronic device 10 is being setup. This may enable voice activated electronic device 10 to determine the echoing offset ΔG prior to outputting any audio data, such as audio data representing phrase 512. However, persons of ordinary skill in the art will recognize that echoing offset ΔG may be dynamically calculated such that changes in the acoustic properties of the environment where voice activated electronic device 10 is located are continually detected and accounted for.

Figure 6:
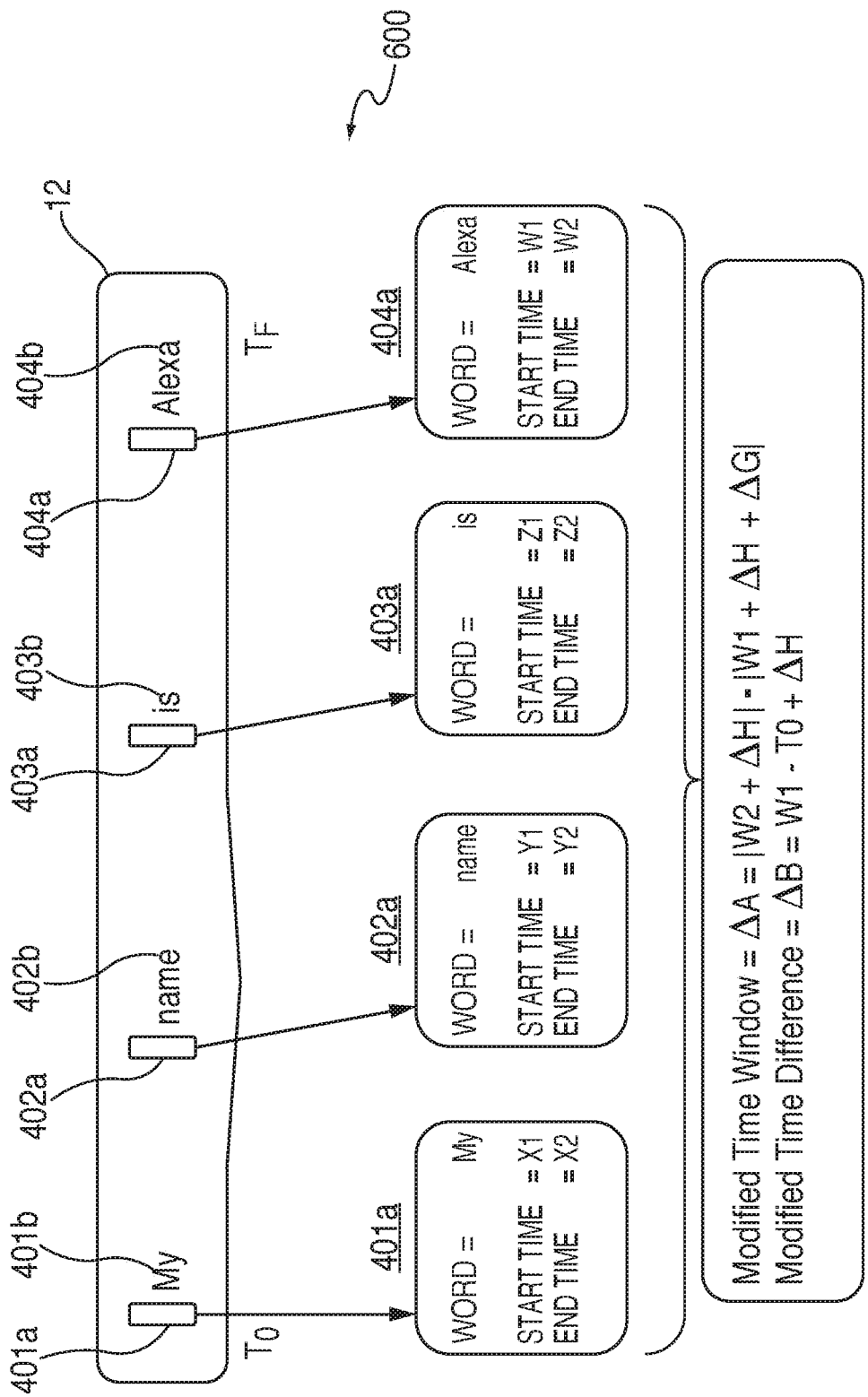
FIG. 6 is an illustrative diagram of an exemplary operation for applying the hardware delays of FIG. 5A and the echoing offsets of FIG. 5B within the architecture of FIG. 1 in accordance with various embodiments.

FIG. 6 is an illustrative diagram of an exemplary operation for applying the hardware delays of FIG. 5A and the echoing offsets of FIG. 5B within the architecture of FIG. 1 in accordance with various embodiments. Scenario 600 of FIG. 6 shows response 12 including data tags 401a-404a and words 401b-404b. As mentioned previously, the hardware delay calculated in scenario 500 of FIG. 5A may cause the previously calculated time window to be shifted in time by an amount ΔH. Shifting the time window by the temporal amount ΔH causes the start time for the word "Alexa" to shift from the start time W1 to now be W1+ΔH. The end time for "Alexa" also shifts from W2 to W2+ΔH. In other words, the new start time would be W1+ΔH, while the initial new end time would be W2+ΔH. This shift, as described in greater detail above, is due to the fact that the time that the audio data representing the response is received by voice activated electronic device 10 is different than the time that the audio data is outputted through speaker(s) 210 due to internal hardware delays of voice activated electronic device 10.

Scenario 600 also details the application of the echoing offset of FIG. 5B to the time window. The echoing offset ΔG accounts for scenarios where voice activated electronic device 10 detects the wakeword in a sound wave has been outputted from speaker(s) 210, reflects off a surface, and then is detected by microphone(s) 208. Echoing offset ΔG causes the time window to be expanded by the temporal amount ΔG. For example, the end time of when the wakeword "Alexa" is played may have initially been W2. After applying the echoing offset ΔG, the final end time of the modified time window may become W2+ΔG. Including the hardware delay ΔH thus causes the end time for the wakeword becomes W2+ΔH+ΔG. Persons of ordinary skill in the art will also recognize that the echoing offset may be applied, instead, to start time W1 instead of the end time W2, and the aforementioned is merely exemplary.

Thus, the time window, after applying the hardware delay and the echoing offset, may be shifted and expanded in time by the aforementioned values. The modified time window may, in some embodiments, be defined by the value ΔA. The time between the start of response 12 begins to be outputted by speaker(s) 210 may therefore be shifted as well. For example, the amount of time between the start of response 12 being played (e.g., T0), and the start of the wakeword "Alexa" being played (e.g., W1), may be equal to the difference between W1, and T0 plus delay ΔH. This modified time difference may, in some embodiments, be defined by the value ΔB. Any occurrence of the wakeword, "Alexa," during the modified time window ΔA may, therefore, be ignored by voice activated electronic device 10, where the occurrence of ΔA begins a time ΔB from the start time T0 of response 12.

FIG. 7A is illustrative diagram of another system for communicating with a backend system for determining portions of audio input data to ignore and portions of audio input data to not ignore in accordance with various embodiments. FIG. 7A, in some embodiments, is substantially similar to FIG. 1, with the exception that the former includes an additional command 14 being asked by individual 2 at a different time than command 4. For example, after command 4 is spoken by individual 2 and response 12 is outputted, individual 2 may begin to say additional command 14. Additional command 14 may, in some embodiments, be spoken after response 12 has finished being outputted by speaker(s) 210, or during the time period when response 12 is outputted. However, for purely illustrative purposes, FIG. 7A shows the exemplary scenario where command 14 is said after response 12 has been outputted.

As mentioned previously, voice activated electronic device 10 monitors audio input data within its environment for occurrences of its wakeword (e.g., "Alexa"). If the wakeword is said during the modified time window, it may be ignored by voice activated electronic device 10. In the exemplary non-limiting embodiment of FIG. 7A, the wakeword, "Alexa," is detected within command 14, which occurs after response 12. In particular, an additional occurrence of the wakeword, "Alexa," occurs outside of the modified time window. For instance, a start time of the additional occurrence of the wakeword occurs at a time later than or equal to the start time of the modified time window. Furthermore, the start time of the additional occurrence of the wakeword occurs at a time equal to or earlier than the end time of the modified time window. In this particular scenario, the audio input data corresponding to the additional occurrence of the wakeword should not be ignored, as it is not part of response 12. For example, portion 30, which includes the wakeword "Alexa" occurring during the modified time portion, will be ignored. However, the additional occurrence of the wakeword "Alexa," occurring during portion 40 of the audio input data, may not be ignored as it is not within the modified time window. By not ignoring the additional occurrence of the wakeword, no instruction to not analyze, record, or process any utterances detected after the wakeword is detected by voice activated electronic device may occur. In some embodiments, this may correspond to restore, or maintaining, power to microphone(s) 208 and/or not disabling speech recognition module 214 or wakeword detector module 218.

Figure 7B:
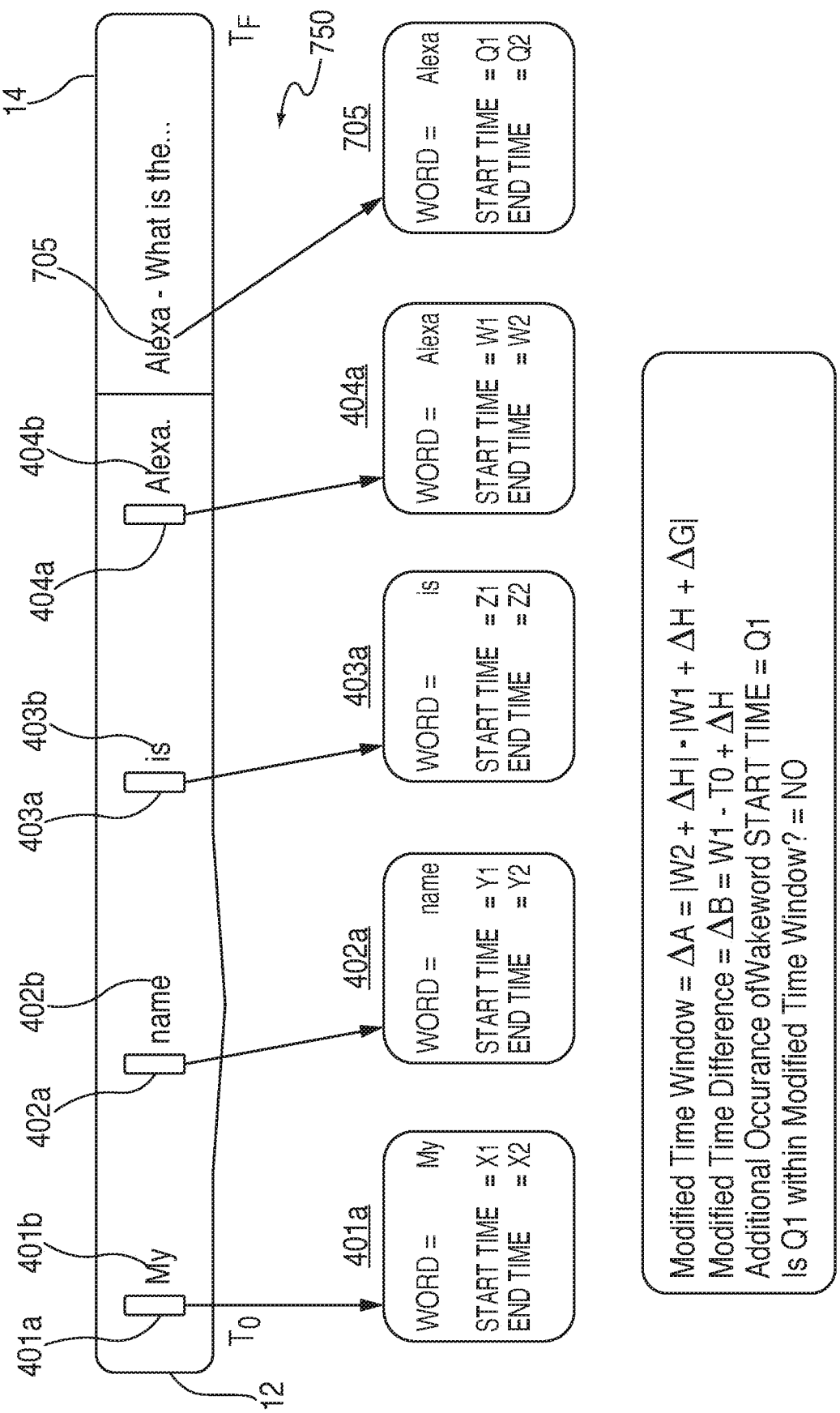
FIG. 7B is an illustrative diagram of an exemplary operation for determining whether a portion of audio input data is to be ignored within the architecture of FIG. 7A in accordance with various embodiments.

FIG. 7B is an illustrative diagram of an exemplary operation for determining whether a portion of audio input data is to be ignored within the architecture of FIG. 7A in accordance with various embodiments. Scenario 750 details the timing breakdown of response 12 and the additional occurrence of the wakeword within command 14. As mentioned previously with regard to FIG. 4, wakeword 404b has data tag 404a, which indicates to voice activated electronic device 10 its start time W1 and its end time W2. From this information, and with hardware delay ΔH and echoing offset ΔG, the modified time window ΔA is determined, as described in greater detail above.

Command 14 includes another occurrence of the wakeword, which in this embodiment, corresponds to word 705, which, within the audio input data captured by microphone(s) 208, begins at time Q1 and ends at time Q2. In some embodiments, voice activated electronic device 10 may determine that start time Q1 of the additional occurrence of wakeword 705 is within the modified time window ΔA. In other words, a time when wakeword 705 begins to be uttered is later than or equal to the start time of the modified time window ΔA and a time when wakeword 705 ends being uttered is earlier than or equal to the end time of modified time window ΔA. For this particular scenario, wakeword 705 may be ignored, and voice activated electronic device 10 may not record portion 40 of command 14.

If, however, the additional occurrence of wakeword 705 is not within the modified time window ΔA (e.g., a time when wakeword 705 begins to be uttered is earlier than or equal to the start time of the modified time window ΔA or a time when wakeword 705 ends being uttered is later than or equal to the end time of modified time window ΔA), then voice activated electronic device 10 may not ignore it. In this particular scenario, voice activated electronic device 10 detects the wakeword being outside of modified time window ΔA, and begins to process the audio input data (e.g., portion 40) that occurs after wakeword 705. This may include performing speech analysis on the audio input data occurring after wakeword 705, and/or sending that audio input data to backend system 100 for processing and analysis. As an illustrative example, command 14 may correspond to individual 2 asking, "Alexa—What is the weather like?" In this particular scenario, after detection the wakeword 705 (e.g., "Alexa"), the command "What is the weather like?" may be recorded by microphone(s) 208, and transmitted to backend system 100 to be analyzed and have a response generated for it.

Figure 8:
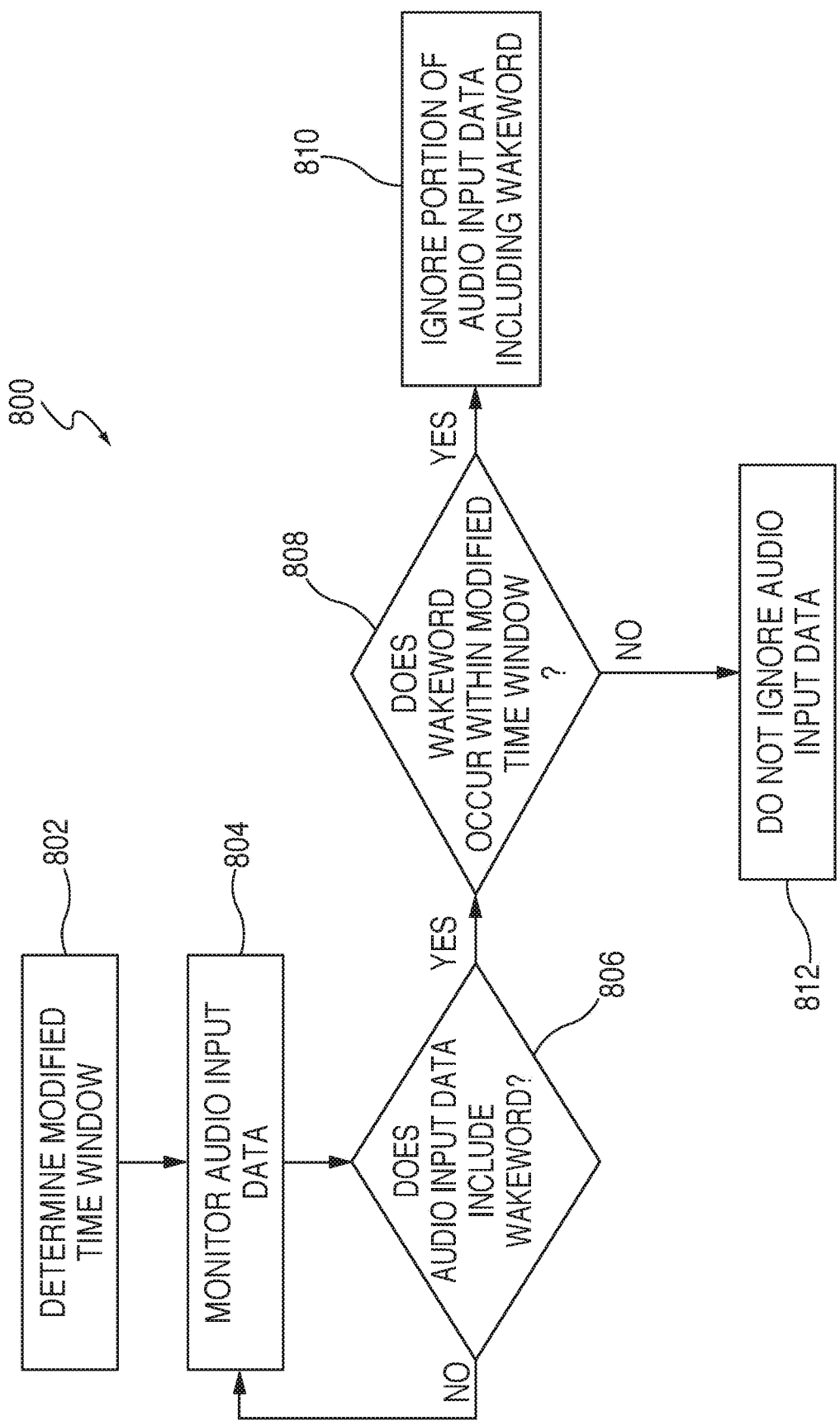
FIG. 8 is an illustrative flowchart of a process for determining whether a portion of audio input data is to be ignored in accordance with various embodiments.

FIG. 8 is an illustrative flowchart of a process for determining whether a portion of audio input data is to be ignored in accordance with various embodiments. Process 800 may begin at step 802. At step 802, a modified time window for when a wakeword may be detected by voice activated electronic device 10 may be determined. For example, modified time window ΔA may be determined based on an initially calculated time window ΔW, and one or more delays/offsets being applied thereto. Such delays/offsets may include, but are not limited to, hardware delays, such as hardware delay ΔH, and echoing offsets, such as echoing offset ΔG. In some embodiments, step 802 of process 800 may be substantially similar to step 314 of process 300, and the previous description may apply.

At step 804, audio input data detected by microphone(s) 208 may be monitored. The audio input data may include any audio signals detectable by voice activated electronic device 10 that occur within the remote environment where voice activated electronic device is located. For example, command 4 and command 14 may correspond to audio input data detectable by voice activated electronic device 10. Various techniques for determining monitoring the audio input data are described in greater detail above.

At step 806, a determination is made as to whether or not the audio input data includes the wakeword. In some embodiments, the audio input data may be converted from speech to text, and the text may be compared with one or more keywords or wakewords stored within list of wakewords database 216 in storage/memory 204. If a match between a word within the converted text of the audio input data and a wakeword for voice activated electronic device 10, then processor(s) 202 may identify that the matching word within the converted text of the audio input data is an occurrence of the wakeword. For example, an SVM classifier may produces a confidence score indicating the likelihood that an audio signal contains the wakeword. The confidence score is compared to a confidence threshold to make a final decision regarding whether a particular portion of the audio signal represents an utterance of wakeword. Upon declaring that the audio signal represents an utterance of the wakeword, voice activated electronic device 10 may then begin transmitting the audio signal to backend system 100 for detecting.

If, however, there are no words within the converted text from the audio input data that match any wakewords (e.g., the confidence score does not exceed the confidence threshold) for voice activated electronic device 10, then processor(s) 202 may identify that the audio input data does not include any occurrences of the wakeword. For example, commands 4 and 14 both include an occurrence of the wakeword, "Alexa." If, at step 806, it is determined that the audio input data detected by voice activated electronic device 10 does not include the wakeword, then process 800 may return to step 804. In this particular scenario, voice activated electronic device 10 may continue to monitor audio input data detected by microphone(s) 208 to for any other occurrences of the wakeword. If, however, at step 806, it is determined that the audio input data includes an occurrence of the wakeword, then process 800 may proceed to step 808.

At step 808, another determination may be made by voice activated electronic device 10 as to whether the wakeword that was determined to be within the audio input data occurs within the modified time window ΔA. For example, as described previously with regards to FIG. 7B, the occurrence of word 705 begins at a time Q1, which is after an end time of the modified time window ΔA. At step 812, for this particular scenario, portion 40 of the audio input data may not be ignored, as the wakeword is not within the modified time window, and therefore may be an additional occurrence of the wakeword not related to response 12. However, if, at step 808, it is determined that the wakeword occurs within modified time window ΔA, then, at step 810, voice activated electronic device 10 may ignore portion 30 of the audio input data corresponding to when that occurrence of the wakeword occurs, which is described in greater detail above. For example, step 810 of process 800 may be substantially similar to step 322 of process 300, and the previous description may apply.

The various embodiments of the invention may be implemented by software, but may also be implemented in hardware, or in a combination of hardware and software. The invention may also be embodied as computer readable code on a computer readable medium. The computer readable medium may be any data storage device which may thereafter be read by a computer system.

The above described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific feature are disclosed as illustrative forms of implementing the claims.

What is claimed is:

1. A computer-implemented method comprising:
   receiving audio data;
   receiving, via a network from a first device external to a second device, metadata corresponding to detection of a wakeword represented in the audio data;
   causing output of audio in response to the audio data; and
   processing the metadata to disable audio processing to avoid a disruption of operation of the second device in response to the wakeword being detected in the audio by the second device.

2. The computer-implemented method of claim 1, wherein the disruption of operation of the second device comprises a disruption of the output of the audio by the second device.

3. The computer-implemented method of claim 1, wherein processing the metadata to avoid the disruption comprises:
   using the metadata to generate a first command to alter operation of a component of the second device; and
   sending the first command to the component.

4. The computer-implemented method of claim 3, wherein:
   the component comprises a hardware component of the second device; and
   the first command causes the hardware component to be disabled.

5. The computer-implemented method of claim 3, wherein:
   the component comprises an audio input component of the second device; and
   the first command causes the audio input component to be disabled.

6. The computer-implemented method of claim 3, wherein:
   the component comprises a speech processing component of the second device; and
   the first command causes the speech processing component to be disabled.

7. The computer-implemented method of claim 3, wherein:
   the component comprises a wakeword detection component of the second device; and
   the first command causes the wakeword detection component to be disabled.

8. The computer-implemented method of claim 3, wherein:
   the component comprises a wakeword detection component of the second device; and
   the first command causes the wakeword detection component to disregard an indication of detection of the wakeword.

9. The computer-implemented method of claim 3, further comprising:
   determining, based at least in part on the metadata, an estimated time window when the wakeword will be represented in output audio; and
   sending a second command to the component to restore operation of the component after the estimated time window.

10. A system, comprising:
    at least one processor;
    at least one memory comprising instructions that, when executed by the at least one processor, cause the system to:

receive audio data;
  receive, via a network from a first device external to a second device, metadata corresponding to detection of a wakeword represented in the audio data;
  cause output of audio in response to the audio data; and
  process the metadata to disable audio processing to avoid a disruption of operation of the second device in response to the wakeword being detected in the audio by the second device.

11. The system of claim 10, wherein the disruption of operation of the second device comprises a disruption of the output of the audio by the second device.

12. The system of claim 10, wherein the instructions that cause the system to process the metadata to avoid the disruption comprise instructions that, when executed by the at least one processor, cause the system to:
  use the metadata to generate a first command to alter operation of a component of the second device; and
  send the first command to the component.

13. The system of claim 12, wherein:
  the component comprises a hardware component of the second device; and
  the first command causes the hardware component to be disabled.

14. The system of claim 12, wherein:
  the component comprises an audio input component of the second device; and
  the first command causes the audio input component to be disabled.

15. The system of claim 12, wherein:
  the component comprises a speech processing component of the second device; and
  the first command causes the speech processing component to be disabled.

16. The system of claim 12, wherein:
  the component comprises a wakeword detection component of the second device; and
  the first command causes the wakeword detection component to be disabled.

17. The system of claim 12, wherein:
  the component comprises a wakeword detection component of the second device; and
  the first command causes the wakeword detection component to disregard an indication of detection of the wakeword.

18. The system of claim 12, wherein the at least one memory further comprises instructions that, when executed by the at least one processor, further cause the system to:
  determine, based at least in part on the metadata, an estimated time window when the wakeword will be represented in output audio; and
  send a second command to the component to restore operation of the component after the estimated time window.

19. A computer-implemented method comprising:
  receiving audio data;
  receiving metadata indicating that a wakeword is represented in the audio data;
  causing output of audio in response to the audio data;
  processing the metadata to avoid a disruption of operation of a device in response to output of the audio corresponding to the wakeword;
  using the metadata to generate a first command to alter operation of an audio input component of the device; and
  sending the first command to the component.

* * * * *